United States Patent [19]
Patrick et al.

[11] 3,825,153
[45] July 23, 1974

[54] SOLID STATE AUTOMATIC FLUID DISPENSING MEANS

[75] Inventors: Bruce R. Patrick, Stow, Ohio; Herbert W. Timms, Tucson, Ariz.

[73] Assignee: Herbert W. Timms, Tucson, Ariz.

[22] Filed: Feb. 22, 1973

[21] Appl. No.: 334,635

[52] U.S. Cl............ 222/14, 222/32, 194/13, 235/92 FL, 307/252 B, 307/310
[51] Int. Cl............................................. B67d 5/30
[58] Field of Search....... 194/5, 13; 307/252 B, 310; 222/2, 14-20, 32-37; 235/92 FL

[56] References Cited
UNITED STATES PATENTS

| | | | |
|---|---|---|---|
| 3,360,094 | 12/1967 | Romanowski | 194/13 |
| 3,483,399 | 12/1969 | Walter et al. | 307/252 B |
| 3,566,162 | 2/1971 | Warrender | 307/310 |
| 3,701,004 | 10/1972 | Tuccinardi et al. | 307/310 X |
| 3,737,017 | 6/1973 | Brunone | 194/13 |

OTHER PUBLICATIONS

Benedict, "Electronics for Scientists and Engineers" 1967, pages 459–462.

Primary Examiner—Robert B. Reeves
Assistant Examiner—Joseph J. Rolla
Attorney, Agent, or Firm—Oldham & Oldham Co.

[57] ABSTRACT

A unique solid state control circuit is disclosed whereby a preselected volume of fluid may be automatically dispensed. Fundamentally, the invention comprises a plurality of selection switches, each of which is associated with a particular volume of fluid. A sequential logic circuit indicates the actual volume of fluid which has been dispensed. A logic network compares the states of the selection switches with the output of the sequential logic circuit so as to determine when the volume of fluid actually dispensed equals the preselected volume indicated by the selection switches. When equivalency occurs the logic network indicates the same to a current source transistor which in turn, through a triac, controls the solenoid pump valve through which the fluid is being dispensed. The circuit disclosed is adaptable for use in presently existing gasoline pumps and is designed with specific considerations given to the ambient conditions in which the circuit must operate.

5 Claims, 1 Drawing Figure

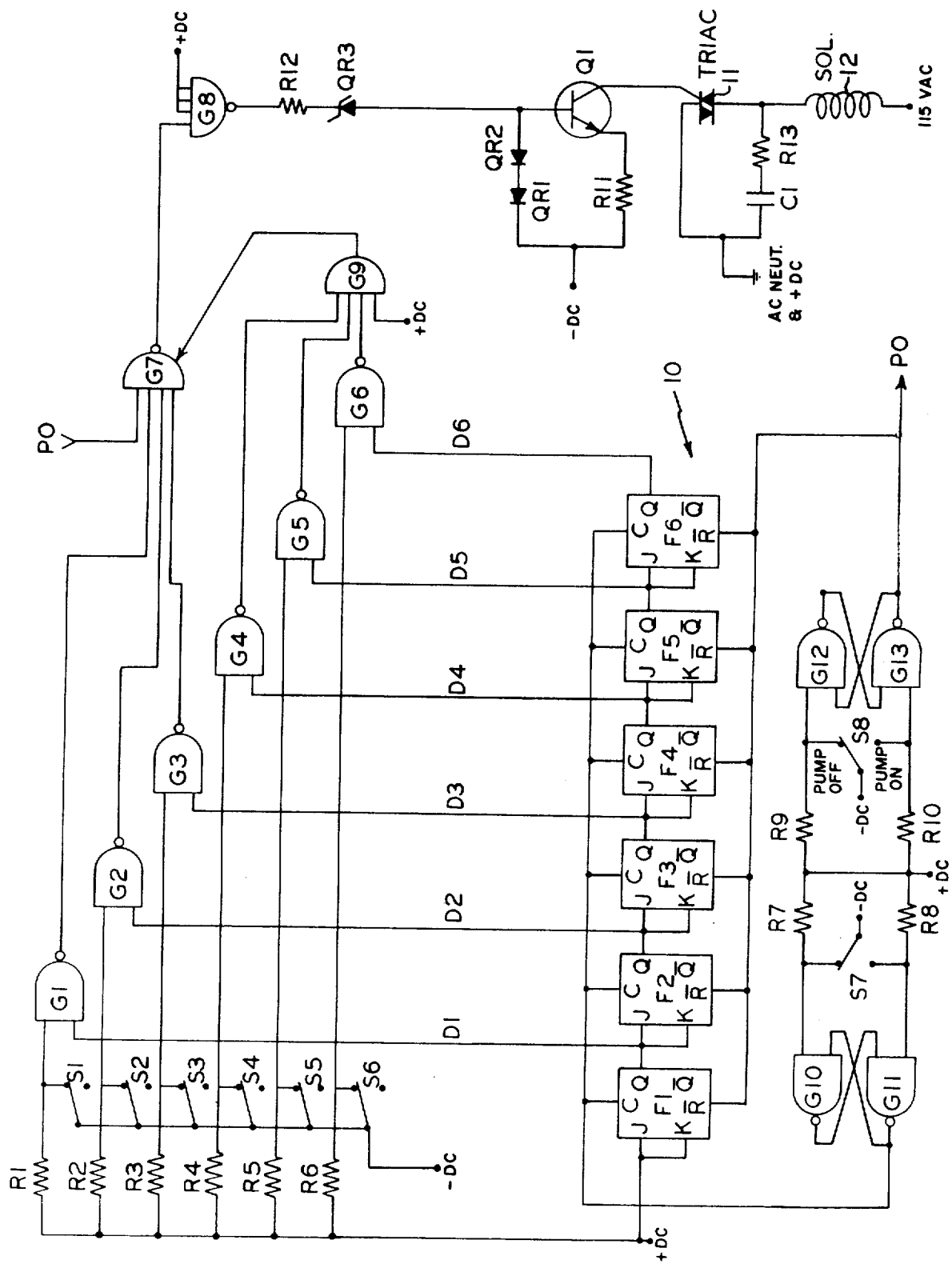

3,825,153

SOLID STATE AUTOMATIC FLUID DISPENSING MEANS

BACKGROUND OF THE INVENTION

Heretofore it has been known to those who frequent gasoline service areas that the attendants thereof provide more service than just the dispensing of gas. Particularly, the attendants are generally responsible for checking the oil and battery water levels and cleaning the windows of the vehicle. While providing such other service the attendant is hardpressed to keep an eye on the gasoline pump to be certain that he does not dispense more gas than the customer has requested. The same situation holds true when a single attendant is required to service more than one vehicle at the same time.

Consequently, it has become desirable to provide automatic gasoline dispensing means whereby an attendant may preselect a particular volume of gas to be dispensed and go about his other chores knowing that when the preselected volume of gas has been dispensed the gasoline pump will automatically shut off.

Of course, the circuitry to achieve the desired results must be designed so as to accurately and reliably operate in an environment of electrical noise and fluctuating weather conditions.

Consequently, it is an object of the instant invention to present a solid state automatic fluid dispensing means to provide a standard gasoline dispensing unit with the capability of being preset to a preselect volume amount, that amount being automatically dispensed by the unit.

It is a further object of the invention to present such a solid state automatic fluid dispensing means which is highly reliable in operation, immune to environmental variances, inexpensive to construct, and readily adaptable for utilization with presently existing gasoline dispensing units.

These objects and other objects which will become apparent as the detailed description proceeds are achieved by a solid state automatic fluid dispensing control circuit, comprising: a series of selection switches; a logic network connected to the selection switches and receiving from the switches electrical indicia of the quantity of fluid to be dispensed; a sequential logic circuit connected to the logic network monitoring the particular amount of fluid which has actually been dispensed and electrically signalling the logic network of such dispensing; and a valve control circuit receiving output signals from the logic network and controllng the fluid flow in accordance therewith.

For a complete understanding of the apparatus and techniques of the instant invention reference should be had to the detailed description and accompanying drawing wherein a schematic diagram of the circuitry comprising the invention is presented.

The instant invention comprises a circuit which may be readily placed within the housing of presently existing gasoline pumps so as to automatically control the flow of gasoline therefrom. Such pumps, as is well known to those skilled in the art, have associated therewith a "computer" or electrical control means whereby metering of the volume of gasoline dispensed may be achieved. Of course, associated with this metering apparatus is circuitry to convert the volume dispensed into a dollar figure representing the amount of the sale. It is of course to be understood that this common electrical apparatus associated with gasoline dispensing units operates on 110 volt line voltage. The actual dispensing of gasoline is provided for by means of a solenoid controlled valve which similarly operates off of the AC line voltage.

When the gasoline pump is off the solenoid valve is closed so that no gasoline can be dispensed. It is desirable that when the gasoline pump is on and a designation has been made by the station attendant that a particular amount of gasoline is to be dispensed the pump will stay on until that amount has been dispensed, at which time the pump will shut off by means of deactivation of the solenoid valve. Of course, it is desirable that the pump be able to operate under manual control of the station attendant whenever a volume of gasoline is to be dispensed which is not available as a preselected quantity. Circuitry to achieve this desired control is shown in the drawing.

It can be seen that the instant invention utilizes a plurality of selection switches S1–S6; these switches indicating by way of example the selection of 1 to 6 dollars worth of gasoline. Of course, there may be any number of selection switches, each of which has associated therewith a particular volume or dollar amount related to the quantity of gas dispensed. The switches S1–S6 are respectively associated with the NAND gates G1–G6. As can be seen from the schematic, the switches S1–S6 in combination with the respective resistors R1–R6 control the application of the positive DC level or negative DC level to one input of the respective NAND gates G1–G6. Of course, the positive and negative DC levels are representative of the logic levels associated with the NAND gates utilized. When a switch is positioned so as to place the positive DC level or logic "1" on an input of a NAND gate the switch thereby indicates that the associated quantity of gas is to be dispensed. For example, if the switch S3 were switched from its position as shown in the drawing, thereby placing a logic 1 on the connected input of the gate G3, it would be understood that $3.00 worth of gasoline is to be dispensed.

A second important portion of the instant invention is the sequential logic circuitry designated generally by the numeral 10. This circuitry comrises a plurality of flip-flops F1–F6. These flip-flops are of the J-K type, requiring a negative clock and a negative reset pulse. As can be seen, the J and K inputs of the flip-flops F2–F6 have been connected to the Q output of the preceding flip-flop; the J-K inpus of the flip-flop F1 being tied to a logic 1. These flip-flops are of such nature that the Q output will toggle when the J and K inputs are at a logic 1 and a pulse is evidenced on the clock input $\overline{C}$. Consequently, the flip-flops F1–F6 comprise a sequential logic circuit wherein successive clock pulses set the Q output of successive flip-flops to a logic 1. In other words, if the flip-flops F1–F6 were all reset then the first clock pulse would set the Q output of F1 to a 1, the second clock would set the Q output of F2 to a 1, the third clock pulse would set the Q output of F3 to a 1, and so forth.

The outputs D1–D6 of the sequential logic circuit 10 are representative of the volume of gasoline which has been dispensed by the dispensing unit. For purposes of this application, D1–D6 respectively indicate that from 1 to 6 dollars worth of gasoline has been dispensed. Of course, the outputs of the sequential logic circuit 10 could equally represent volume amounts or other cash values. To cause the outputs of the circuit 10 to so indicate the number of dollars worth of gasoline dispensed, the clock signals associated therewith must be generated by the value indicating circuit or mechanism of the gasoline pump. The preferred way of creating such a clock pulse is to locate the magnet of a magnetic reed switch S7 in the 10 cent wheel of the value indicating mechanism of the pump in such a manner that the reed switch S7 is toggled one time for every dollar's worth of gasoline dispensed.

Since the reed switch S7 is an electromechanical device, false pulses might be created by the characteristic bounce of the contacts. To eliminate this bounce effect the latch circuit comprising gates G10 and G11 is utilized. The fast propagation times of the gates G10 and G11 will guarantee that the slower electromechanical bounce of the switch S7 will not affectuate false clock pulses at the clock inputs of the sequential logic circuit 10. It can be seen then that as the switch S7 is caused to toggle, alternately applying high and low logic inputs to the gates G10 and G11, corresponding clock pulses will affect the cirucit 10 thus indicating when particular volumes of gas have been dispensed.

An initialization or reset pulse is associated with the sequential logic circuit 10. The outputs of the circuit 10, D1–D6, should of course be initialized or set to a logic 0 after the desired quantity of gas has been dispensed so as to be prepared for a subsequent dispensing. For this purpose, the switch S8 is provided. Although the switch S8, which indicates the on-off conditions of the pump, is shown in the schematic to be a standard mechanical switch, it is to be understood that such indicia is readily available within the pump control circuitry itself and in actual operation might well be taken therefrom. Again, a latch comprising gates G12 and G13 is utilized to prevent switch bounce. It can be seen from the schematic that the flip-flops F1–F6 require negative reset pulses and hence will reset when the switch S8 is switched to the "pump off" position. Of course, flip-flops having positive reset pulses are available such that the flip-flops will be initialized when the pump is turned on. It should further be noted that the signal PO, indicative of the on-off condition of the pump, enables the gate G7.

A complete understanding of the operation of the logic circuitry of the invention may now be had by way of example. If it is desirable to dispense four dollars worth of gas the switch S4 will be placed in such a condition as to apply the positive DC level to the associated input of the gate G4. All other switches S1–S6 would be left in such a position as to place the negative DC level on the respective inputs of their associated gates G1–G6. At this time the flip-flops F1–F6 have been reset such that the outputs D1–D6 are at logic 0's. Consequently, the outputs of the gates G1–G6 are a logic 1's, the signal PO being a logic 1, and consequently the output of the gate G8 is at a logic 1. As will be discussed more fully hereinafter, a logic 1 at the output of the gate G8 activates the solenoid valve of the gas pump so as to allow the dispensing of gas. As the gas is dispensed the sequential logic circuit 10 counts the number of dollars worth of gas dispensed. When 4 dollar's worth of gas has been dispensed the output D4 of flip-flop F4 goes to a logic 1 causing the output of the gate G4 to go to a logic 0 causing the output of the gate G8 to consequentially go to a logic 0. As will further be discussed, a logic 0 at the output of G8 deactivates the solenoid valve of the gas pump and ceases the dispensing of gasoline. Hence it can be seen that the preselected four dollar's worth of gasoline has been automatically dispensed.

It should further be noted that with none of the switches S1–S6 selected and the switch S8 placed in the "pump on" position, the gasoline may be manually dispensed since the output of the gate G8 will be at a logic 1.

The actual regulation of the solenoid pump valve is achieved by means of a transistor controlled triac. A transistor Q1 is used as a current source to be switched on or off by the output of the gate G8. The current flowing through Q1 is of course determined by R11 which is selected to provide simultaneously for the desired amount of current flow and approximately one forward diode voltage drop at room temperature. Hence, the diode bias scheme comprising diodes QR1, and QR2, provides for circuit stability irrespective of ambient temperature changes. The resistor R12 is of course used to limit the amount of forward current through the bias diodes and the zener diode QR3 clamps the transistor Q1 off when the system is originally turned on and the elements thereof reach their initial states. The resistor and capacitor loop comprising R13 and C1 about the triac 11 is provided to limit the fluctuation of voltage, $dv/dt$, which would be impressed on the triac 11 due to the inductive load represented by the solenoid 12. This of course guarantees that the triac 11 will turn off reliably.

It can be seen then that with the output of the gate G8 in its high state the transistor Q1 conducts consequently turning on the triac 11. With the triac 11 conducting the AC solenoid 12, which controls the solenoid pump valve, is activated so as to allow the dispensing of gas. When the output of the gate G8 goes to its low level the transistor Q1 is turned off consequently turning off the triac 11 and deactivating the solenoid 12.

With an understanding of the circuitry of the invention, brief consideration should be given to the selection of discrete components to be utilized in constructing the circuitry. In addition to the usual considerations of cost, longevity, and maintenance free performance, the very nature of a gasoline dispensing operation necessitates circuit components that are physically durable, capable of withstanding large variations in ambient temperature, and have inherently high immunity to electrical noise. Typical operating environments would expose the control system to frequent vibration, and temperature extremes ranging from well below 0° F to possibly as high as 160° F. The system will also be continuously subjected to sixty cycle noise due to the starting and stopping of pump motors, motor contacts, and various other control relays. Further noise will be generated by area lighting such as fluorescent lamps and automobile ignition systems.

Consequently, a high threshold logic family of integrated circuit devices having an inherently high degree of electrical noise immunity should be utilized. Further, the effective temperature operating range of the integrated circuitry should be conducive to operation in the above-mentioned environment. Such a logic family is the Motorola high threshold logic family (MHTL).

It should of course be understood that a suitable AC to CD converter must be utilized with the invention to provide the proper DC voltages for operation of the circuit components selected. Such converters are readily available and well known in the art.

So it can be seen that the objects of the invention have been satisfied by the circuitry described hereinabove. While in accordance with the Patent Statues only the best known and preferred embodiment of the invention has been presented and described in detail, it is to be understood that the invention is not limited thereto or thereby. Consequently, for a true appreciation of the intended scope of the invention reference should be had to the appended claims.

What is claimed is:

1. A solid state automatic fluid dispensing control circuit, comprising:
   a series of selection switches;
   a logic network connected to the selection switches and receiving from the switches electrical indicia of the quantity of fluid to be dispensed;
   a sequential logic circuit of series-connected flip-flops connected to the logic network monitoring the particular amount of fluid which has actually been dispensed and electrically signalling the logic network of such dispensing;
   a clock circuit, comprising a reed switch connected to a latch circuit, connected to the sequential logic circuit, the clock circuit producing electrical pulses indicative of the amount of fluid dispensed for updating the sequential logic circuit; and
   a valve control circuit receiving output signals from the logic network and controlling the fluid flow in accordance therewith.

2. The control circuit as recited in claim 1 wherein the valve control circuit comprises a transistor controlled triac, the triac being in shunt with a series connected resistor and capacitor for limiting voltage fluctuations incident to the triac.

3. The control circuit as recited in claim 2 wherein the transistor is shunted across its base-emitter junction with at least one diode to provide temperature stability.

4. A fluid dispensing control circuit for controlling the automatic dispensing of a preselected volume of fluid through a valve from a fluid dispensing means, comprising:
   sequential logic circuitry of series-connected flip-flops for electrically monitoring the actual dispensing of fluid from the fluid dispensing means;
   a plurality of operator selectable switches, one associated with each of a particular value of fluid to be dispensed;
   a logic network comprising a plurality of gates, one connected to and enabled by a corresponding one of the switches and further connected to the output of a corresponding one of the flip-flops, the outputs of the gates correlating the actual dispensing of fluid from the fluid dispensing means with the preselected volume of fluid to be dispensed; and
   a valving circuit connected to and receiving signals from the logic network and controlling the actuation of the valve in accordance therewith.

5. A control circuit as recited in claim 4 wherein the valving circuit comprises a transistor controlled triac, the transistor being temperature insensitive and the triac being shunted by a voltage transient negating circuit.

* * * * *